(12) United States Patent
Wanibe et al.

(10) Patent No.: US 10,738,719 B2
(45) Date of Patent: Aug. 11, 2020

(54) CONTROLLER AND CONTROL METHOD FOR INTERNAL COMBUSTION ENGINE

(71) Applicant: TOYOTA JIDOSHA KABUSHIKI KAISHA, Aichi-ken (JP)

(72) Inventors: Masahiro Wanibe, Nagoya (JP); Toshiaki Otani, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 11 days.

(21) Appl. No.: 16/260,107

(22) Filed: Jan. 29, 2019

(65) Prior Publication Data

US 2019/0285009 A1    Sep. 19, 2019

(30) Foreign Application Priority Data

Mar. 16, 2018  (JP) .................................. 2018-049319

(51) Int. Cl.
| | |
|---|---|
| *F02D 41/00* | (2006.01) |
| *F02D 41/04* | (2006.01) |
| *F02M 35/10* | (2006.01) |
| *F02D 41/14* | (2006.01) |
| *F02D 11/10* | (2006.01) |

(52) U.S. Cl.
CPC ........ *F02D 41/0002* (2013.01); *F02D 11/105* (2013.01); *F02D 41/045* (2013.01); *F02D 41/1497* (2013.01); *F02M 35/10386* (2013.01); *F02D 2041/0017* (2013.01); *F02D 2200/0402* (2013.01); *F02D 2200/0404* (2013.01); *F02D 2200/0406* (2013.01)

(58) Field of Classification Search
CPC .. F02D 41/0002; F02D 11/105; F02D 41/045; F02D 41/1497; F02D 2041/0017; F02D 2200/0402; F02D 2200/0404; F02D 2200/0406; F02M 35/10386
See application file for complete search history.

(56) References Cited

U.S. PATENT DOCUMENTS

| | | | |
|---|---|---|---|
| 5,611,309 A | 3/1997 | Kumagai et al. | |
| 6,276,333 B1 | 8/2001 | Kazama et al. | |
| (Continued) | | | |

FOREIGN PATENT DOCUMENTS

| | | |
|---|---|---|
| EP | 1510677 A2 | 3/2005 |
| JP | H3-189354 A | 8/1991 |
| (Continued) | | |

*Primary Examiner* — Thomas N Moulis
(74) *Attorney, Agent, or Firm* — Hauptman Ham, LLP (57) ABSTRACT

A controller for an internal combustion engine defines a difference between a throttle opening degree target value before correction and a throttle opening degree target value after correction as a correction amount. The difference between a downstream pressure that is a pressure downstream of a throttle valve in the intake passage and a required value of the downstream pressure is defined as a pressure difference. The controller corrects the throttle opening degree target value so that the correction amount increases as the absolute value of the pressure difference increases, the correction amount is smaller when the throttle opening degree is large than when the throttle opening degree is small, and the correction amount is smaller when the flow velocity of intake air in the intake passage is low that when the flow velocity of the intake air is high.

7 Claims, 3 Drawing Sheets

(56) References Cited

U.S. PATENT DOCUMENTS

| | | | | |
|---|---|---|---|---|
| 2005/0081823 | A1* | 4/2005 | Muto | F02D 11/105 |
| | | | | 123/350 |
| 2006/0276954 | A1* | 12/2006 | Muto | F02D 9/02 |
| | | | | 701/110 |
| 2008/0091333 | A1* | 4/2008 | Yamashita | F02D 41/0002 |
| | | | | 701/103 |
| 2008/0109145 | A1* | 5/2008 | Eiraku | F02D 23/02 |
| | | | | 701/103 |
| 2009/0292452 | A1* | 11/2009 | Nishimura | F02D 11/10 |
| | | | | 701/106 |
| 2014/0116376 | A1* | 5/2014 | Hagari | F02D 41/182 |
| | | | | 123/319 |
| 2019/0024575 | A1* | 1/2019 | Maruo | F02D 23/02 |

FOREIGN PATENT DOCUMENTS

| | | | |
|---|---|---|---|
| JP | 2000-97073 | A | 4/2000 |
| JP | 2012-7486 | A | 1/2012 |
| JP | 2014-92146 | A | 5/2014 |
| JP | 2015-21434 | A | 2/2015 |

* cited by examiner

CONTROLLER AND CONTROL METHOD FOR INTERNAL COMBUSTION ENGINE

RELATED APPLICATIONS

The present application claims priority of Japanese Application Number 2018-049319, filed on Mar. 16, 2018, the disclosure of which is hereby incorporated by reference herein in its entirety.

BACKGROUND

The present disclosure relates to a controller and a control method for an internal combustion engine applied to an internal combustion engine in which a throttle valve is provided in an intake passage.

Such a controller for an internal combustion engine calculates a throttle opening degree target value that is a target value of the opening degree of the throttle valve in accordance with a target torque of the internal combustion engine. Further, a controller has been known that calculates the operation amount of the throttle valve by feedback control using the difference between the throttle opening degree target value and the throttle opening degree that is the opening degree of the throttle valve. When the throttle valve is operated based on the operation amount calculated as above, the change of the intake air amount that is the amount of the intake air introduced to a combustion chamber via the intake passage may be delayed with respect to the change of the throttle opening degree target value.

A controller disclosed in Japanese Laid-Open Patent Publication No. 2012-7486 corrects a throttle opening degree target value calculated based on a target torque based on a compensation amount based on the delay in the change of the intake air amount that is assumed. Further, the controller calculates the operation amount of a throttle valve with use of the throttle opening degree target value after correction, and operates the throttle valve based on the operation amount.

SUMMARY

Examples of the present disclosure will now be described.

Example 1

A controller for an internal combustion engine is provided. The internal combustion engine includes a throttle valve provided in an intake passage. The controller is configured to perform a target value derivation process for deriving a throttle opening degree target value based on a target torque of the internal combustion engine, the throttle opening degree target value being a target value of an opening degree of the throttle valve; a process of calculating an operation amount of the throttle valve by feedback control based on a difference between the throttle opening degree target value and a throttle opening degree that is an opening degree of the throttle valve; a process of operating the throttle valve based on the operation amount; a target value correction process of correcting the throttle opening degree target value derived by the target value derivation process so that the operation amount calculated by the feedback control increases; and a downstream pressure acquisition process of acquiring a downstream pressure that is a pressure downstream of the throttle valve in the intake passage. A difference between the throttle opening degree target value before correction and the throttle opening degree target value after correction is defined as a correction amount. A difference between a required value of the downstream pressure and the downstream pressure is defined as a pressure difference. The target value correction process is configured correct the throttle opening degree target value derived by the target value derivation process such that: the correction amount increases as an absolute value of the pressure difference increases; the correction amount is smaller when the throttle opening degree is large than when the throttle opening degree is small; and the correction amount is smaller when a flow velocity of intake air in the intake passage is low than when the flow velocity of the intake air is high.

The change characteristics of the intake air amount when the throttle opening degree is changed are as follows.

When the throttle opening degree is small and the flow velocity of the intake air in the intake passage is high, the change amount of the intake air amount when the throttle opening degree is changed tends to be large.

When the throttle opening degree is large or when the flow velocity of the intake air in the intake passage is low, it is less likely for the change amount of the intake air amount when the throttle opening degree is changed to become large.

Further, when the absolute value of the above-mentioned pressure difference is large, it can be said that a significant change of the intake air amount is required. Therefore, as the absolute value of the pressure difference increases, it is more desired that the throttle opening degree be speedily changed.

In the above-mentioned configuration, in a situation in which the throttle opening degree is small and the flow velocity of the intake air in the intake passage is high, the above-mentioned correction amount tends to be large. Therefore, in the situation as above, the throttle opening degree target value can be corrected so that the above-mentioned correction amount increases as the absolute value of the above-mentioned pressure difference increases. Further, by performing the feedback control with use of the throttle opening degree target value corrected as above, the operation amount of the throttle valve to be calculated can be increased. As a result, when the throttle opening degree is desired to be eventually converged to the opening degree convergence target value, the following can be performed. For example, when the throttle opening degree is increased, the throttle opening degree can converge to the opening degree convergence target value after causing the throttle opening degree to significantly overshoot the opening degree convergence target value. Further, when the throttle opening degree is reduced, for example, the throttle opening degree can converge to the opening degree convergence target value after causing the throttle opening degree to significantly undershoot the opening degree convergence target value. Therefore, the intake air amount can be changed with respect to the change of the throttle opening degree target value at an early stage.

In the above-mentioned configuration, in a situation in which the throttle opening degree is large or in a situation in which the flow velocity of the intake air in the intake passage is low, it is less likely for the above-mentioned correction amount to become large. That is, when the intake air amount does not change significantly even when the throttle opening degree is changed, it is less likely for the above-mentioned correction amount to become large even when the absolute value of the pressure difference is large. As a result, when the intake air amount does not change significantly even when the throttle opening degree is changed, it is less likely for the operation amount to become large even when the operation amount is calculated by feedback control using the throttle opening degree target value after correction. By operating the throttle valve based on the operation amount as above, the overshoot of the throttle opening degree with respect to the opening degree convergence target value is less likely to occur when the throttle opening degree is increased, for example. Further, when the throttle opening degree is reduced, for example, the undershoot of the throttle opening degree with respect to the opening degree convergence target value is less likely to occur. That is, a case where the throttle valve is excessively operated even in a situation in which the effect of suppressing the delay in the change of the intake air amount cannot be expected so much even when the operation amount of the throttle valve is increased can be suppressed. That is, according to the above-mentioned configuration, excessive operation of the throttle valve can be suppressed in a situation in which the effect of suppressing the delay in the change of the intake air amount cannot be expected so much even when the operation amount of the throttle valve is increased.

Therefore, according to the above-mentioned configuration, the throttle opening degree target value can be corrected in consideration of the change characteristics of the intake air amount when the throttle opening degree is changed. Therefore, the delay in the change of the intake air amount with respect to the change of the throttle opening degree target value can be suppressed while suppressing the excessive operation of the throttle valve.

In the case of the above-mentioned document, when the throttle valve is operated, the overshoot amount of the throttle opening degree may increase as the operation amount of the throttle valve increases as compared to a case where the throttle opening degree target value is not corrected, for example. However, the delay in the change of the intake air amount with respect to the change of the throttle opening degree target value can be suppressed.

Further, when the difference between the pressure of the intake upstream of the throttle valve in the intake passage and the pressure of the intake downstream of the throttle valve is defined as an intake pressure difference, the change amount of the intake pressure difference when the throttle opening degree is changed by a specified amount changes in accordance with the throttle opening degree at that time and the flow velocity of the intake air in the intake passage. Specifically, the change amount of the intake pressure difference when the throttle opening degree changes by a specified amount decreases as the throttle opening degree increases. Further, the change amount of the intake pressure difference when the throttle opening degree changes by a specified amount decreases as the flow velocity of the intake air in the intake passage decreases. As described above, when the change amount of the intake pressure difference is small, it means that the change amount of the intake air amount when the throttle opening degree is changed is small.

Further, when it is less likely for the change amount of the intake pressure difference to become large even when the throttle opening degree is changed, the change speed of the intake air amount hardly changes even when the throttle opening degree target value is corrected and the above-mentioned overshoot amount is increased as with the case where the change amount of the intake pressure difference tends to be large. That is, there is a fear that the throttle valve is only excessively operated. The above-mentioned configuration can suppress such fear.

The pressure upstream of the throttle valve in the intake passage is defined as the upstream pressure, and the ratio of the downstream pressure to the upstream pressure is defined as the throttle upstream-downstream pressure ratio. During the operation of the engine, the downstream pressure does not become higher than the upstream pressure. Therefore, the maximum value of the throttle upstream-downstream pressure ratio is 1. Further, under the condition in which the flow velocity of the intake air in the intake passage is constant, the throttle upstream-downstream pressure ratio approaches 1 as the throttle opening degree increases. Further, in a situation in which the throttle opening degree is constant, the throttle upstream-downstream pressure ratio approaches 1 as the flow velocity of the intake air in the intake passage decreases. That is, the throttle upstream-downstream pressure ratio can be said to be a value in which both of the throttle opening degree and the flow velocity of the intake air are reflected.

In Example 2, the controller of Example 1 is configured to perform an upstream pressure acquisition process of acquiring an upstream pressure. The target value correction process is preferably configured to perform: a process of calculating a first correction coefficient so that the first correction coefficient increases as the pressure difference increases; a process of calculating a second correction coefficient so that the second correction coefficient decreases as the throttle upstream-downstream pressure ratio approaches 1; and a process of calculating a throttle opening degree target value after correction so that an absolute value of a product of the throttle opening degree target value derived by the target value derivation process, the first correction coefficient, and the second correction coefficient is equal to the correction amount.

In the above-mentioned configuration, the throttle opening degree target value is corrected in accordance with the target torque of the internal combustion engine with use of the first correction coefficient calculated based on the above-mentioned pressure difference and the second correction coefficient calculated based on the throttle upstream-downstream pressure ratio. That is, the throttle opening degree target value can be corrected in consideration of the change characteristics of the intake air amount when the throttle opening degree is changed.

When the above-mentioned throttle upstream-downstream pressure ratio is small, it can be determined that the intake air amount easily changes in accordance with the change of the throttle opening degree. When the throttle upstream-downstream pressure ratio is large, it can be determined that the intake air amount changes less easily even when the throttle opening degree is changed. Thus, as Example, 3, in the controller of Example 2, the target value correction process is configured to: maintain the second correction coefficient at a specified value when the throttle upstream-downstream pressure ratio is less than a specified pressure ratio; and cause the second correction coefficient to be less than the specified value when the throttle upstream-downstream pressure ratio is equal to or more than the specified pressure ratio.

According to the above-mentioned configuration, when the throttle upstream-downstream pressure ratio is less than the specified pressure ratio, it can be determined that the throttle upstream-downstream pressure ratio is small, and hence the second correction coefficient increases as compared to when the throttle upstream-downstream pressure ratio is equal to or more than the specified pressure ratio, for example. Therefore, by correcting the throttle opening degree target value with use of the second correction coefficient, the above-mentioned correction amount tends to be large. Therefore, when the first correction coefficient is large because the above-mentioned pressure difference is large, the operation amount can be increased by the feedback control using the throttle opening degree target value after correction. Further, by operating the throttle valve based on the operation amount, the intake air amount can be changed with respect to the change of the throttle opening degree target value at an early stage.

When the throttle upstream-downstream pressure ratio is equal to or more than the specified pressure ratio, it can be determined that the throttle upstream-downstream pressure ratio is large, and hence the second correction coefficient becomes smaller than specified value. Therefore, even when the throttle opening degree target value is corrected with use of the second correction coefficient, it is less likely for the above-mentioned correction amount to become large. Therefore, even when the first correction coefficient is large because the above-mentioned pressure difference is large, the operation amount calculated by the feedback control using the throttle opening degree target value after correction does not increase significantly. Further, by operating the throttle valve based on the operation amount, excessive operation of the throttle valve can be suppressed.

For example, as Example 4, in the controller of Example 3, the target value correction process is configured to calculate the second correction coefficient so that the second correction coefficient gradually decreases as the throttle upstream-downstream pressure ratio approaches 1 when the throttle upstream-downstream pressure ratio is equal to or more than the specified pressure ratio. According to this configuration, the above-mentioned correction amount can less easily increase as the throttle upstream-downstream pressure ratio increases, that is, as the intake air amount is less easily changed with respect to the change of the throttle opening degree.

As Example 5, in the controller of any one of Examples 1 to 4, the target value correction process is configured to correct and increase the throttle opening degree target value derived by the target value derivation process when the throttle opening degree target value increases. According to this configuration, when the output torque of the internal combustion engine is instructed to increase, the throttle opening degree target value is corrected as above. Therefore, the delay in the increase of the intake air amount with respect to the increase of the throttle opening degree target value can be suppressed while suppressing excessively operation of the throttle valve. That is, the output torque of the internal combustion engine can be increased at an early stage.

Example 6

A control method for an internal combustion engine is provided that performs the processes described in any one of Examples 1 to 5.

Example 7

A non-transitory computer readable memory medium is provided that stores a program that causes a processor to perform the processes described in any one of Examples 1 to 5.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION

A controller for an internal combustion engine according to an embodiment of the present disclosure will now be described with reference to FIGS. 1 to 5.

Figure 1:
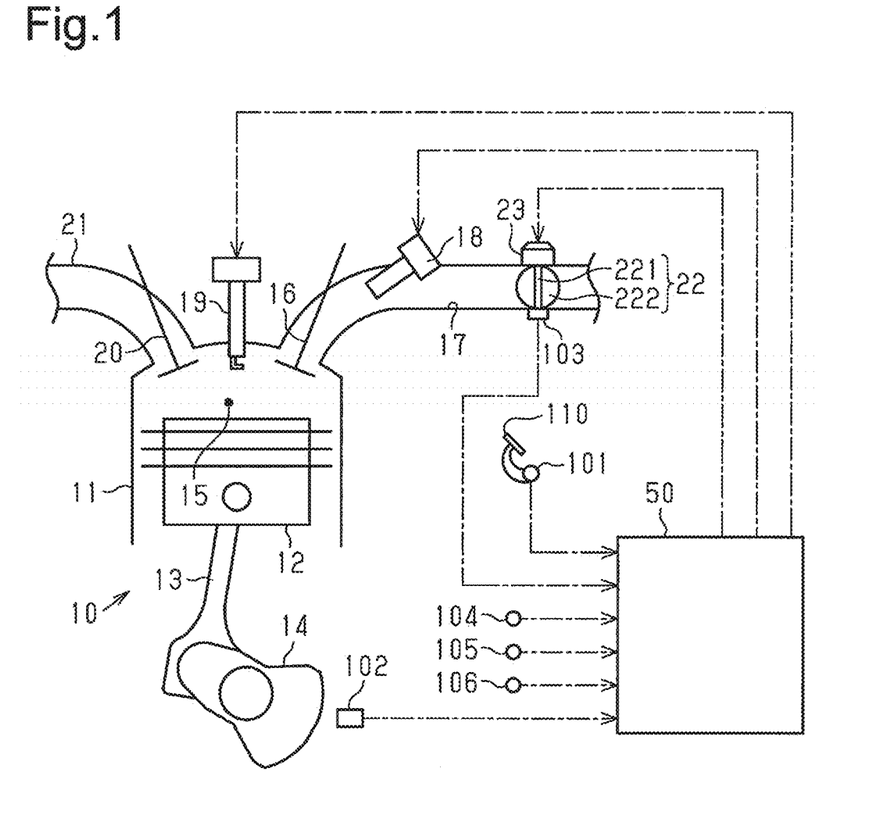
FIG. 1 is a configuration diagram illustrating an overview of an internal combustion engine including a controller for an internal combustion engine according to an embodiment of the present disclosure.

FIG. 1 illustrates an internal combustion engine 10 including a controller 50 of the present embodiment. As illustrated in FIG. 1, the internal combustion engine 10 includes a plurality of cylinders 11 (only one is illustrated in FIG. 1), and pistons 12 respectively reciprocate in the cylinders 11. Each of those pistons 12 is connected to a crankshaft 14 via a connecting rod 13. The region above the piston 12 in the cylinder 11 is a combustion chamber 15. The intake air is introduced to each combustion chamber 15 via an intake passage 17 when an intake valve 16 is open. Further, in each combustion chamber 15, when ignition is performed on the air-fuel mixture including the intake air introduced via the intake passage 17 and the fuel injected from a fuel injection valve 18 by a spark plug 19, the air-fuel mixture is burned. The exhaust gas generated in each combustion chamber 15 by the combustion of the air-fuel mixture as above is exhausted to an exhaust passage 21 when an exhaust valve 20 is open. In the internal combustion engine 10 illustrated in FIG. 1, the fuel injection valve 18 injects the fuel to the intake passage 17.

In the intake passage 17, a throttle valve 22 that operates so as to adjust the intake air amount introduced to each combustion chamber 15 is provided. The throttle valve 22 is a so-called butterfly valve, and includes a rotating shaft 221, and a valve body 222 that rotates about the rotating shaft 221. Further, when the throttle valve 22 is operated based on the driving force input from the actuator 23, that is, when the valve body 222 rotates, a throttle opening degree TA that is the opening degree of the throttle valve 22 changes.

As illustrated in FIG. 1, signals are input to the controller 50 from various sensors such as an accelerator operation amount sensor 101, a crank angle sensor 102, a throttle sensor 103, an air flow meter 104, an atmospheric pressure sensor 105, and a pressure sensor 106. The accelerator operation amount sensor 101 detects an accelerator operation amount ACCP that is the operation amount of an accelerator pedal 110 obtained by a driver of a vehicle, and outputs a signal in accordance with the accelerator operation amount ACCP. The crank angle sensor 102 detects an engine rotation speed NE that is the rotation speed of the crankshaft 14, and outputs a signal in accordance with the engine rotation speed NE. The throttle sensor 103 detects the throttle opening degree TA, and outputs a signal in accordance with the throttle opening degree TA. The air flow meter 104 detects an intake air amount GA, and outputs a signal in accordance with the intake air amount GA. The atmospheric pressure sensor 105 detects an atmospheric pressure PA, and outputs a signal in accordance with the atmospheric pressure PA. The pressure sensor 106 detects a downstream pressure Pm that is the pressure downstream (that is, the combustion chamber 15 side) of the throttle valve 22 in the intake passage 17, and outputs a signal in accordance with the downstream pressure Pm. Further, the controller 50 controls the actuator 23 and the fuel injection valve 18 and controls the period of ignition performed by the spark plug 19 based on the signals from the various sensors 101 to 106.

Figure 2:
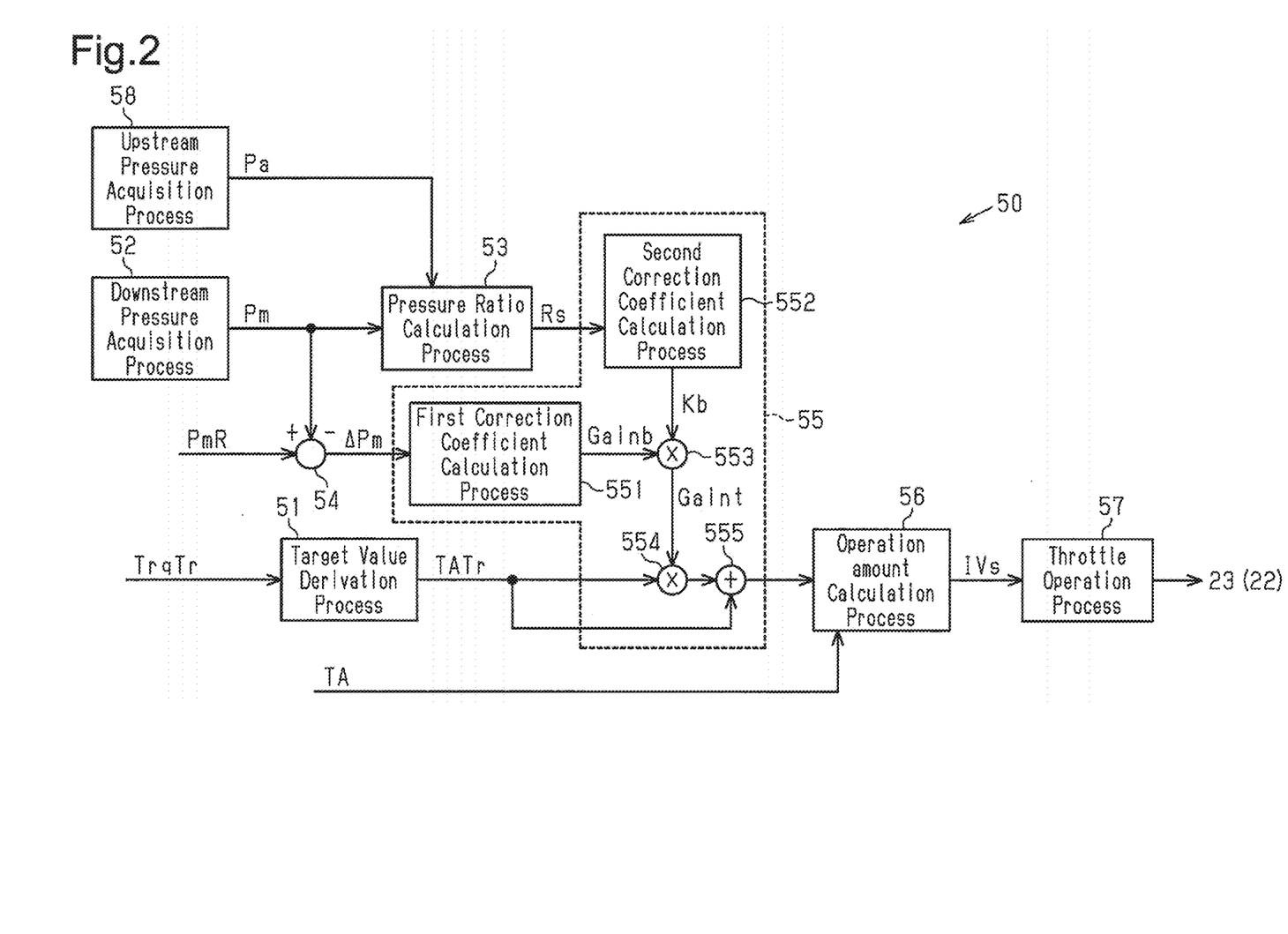
FIG. 2 is a block diagram illustrating the functional configuration of the controller in the internal combustion engine in FIG. 1.

FIG. 2 illustrates the functional configuration of the controller 50 for controlling the operation of the throttle valve 22. The processing units indicating the functional configuration of the controller 50 may be simply described below as processes. The controller 50 may include a processor, and a storage device storing therein a program for the processor to execute processes. As illustrated in FIG. 2, the controller 50 includes a target value derivation process (target value derivation unit) 51 for deriving a throttle opening degree target value TATr based on a target torque TrqTr that is a target value of the output torque of the internal combustion engine 10. The target value derivation process 51 is a processing unit that derives the throttle opening degree target value TATr so that the throttle opening degree target value TATr becomes higher as the target torque TrqTr becomes higher.

The target torque TrqTr is calculated as follows in the controller 50. That is, a plurality of required torques such as a required torque calculated based on the accelerator operation amount ACCP, and a required torque needed to drive an auxiliary machine are calculated. Further, the target torque TrqTr is calculated by adjusting the respective required torques.

Further, the controller 50 includes a downstream pressure acquisition process 52, an upstream pressure acquisition process 58, a pressure ratio calculation process 53, a first calculation process 54, a target value correction process 55, an operation amount calculation process 56, and a throttle operation process 57. The downstream pressure acquisition process 52 derives the downstream pressure Pm downstream of the throttle valve 22 in the intake passage 17. In this embodiment, the pressure sensor 106 for detecting the downstream pressure Pm is provided in the internal combustion engine 10. Therefore, the downstream pressure acquisition process 52 calculates the downstream pressure Pm based on the output signal of the pressure sensor 106. When the pressure sensor 106 is not provided in the internal combustion engine 10, the downstream pressure acquisition process 52 estimates the downstream pressure based on changes in the intake air amount GA, changes in the throttle opening degree TA, and changes in the engine rotation speed NE, and derives the estimated value as the downstream pressure Pm.

The upstream pressure acquisition process 58 acquires an upstream pressure Pa that is a pressure upstream of the throttle valve 22 in the intake passage 17. For example, when the internal combustion engine 10 is a naturally-aspirated internal combustion engine, the upstream pressure Pa can be assumed to be substantially the same as the atmospheric pressure PA. Therefore, the upstream pressure acquisition process 58 acquires the atmospheric pressure PA calculated based on the output signal of the atmospheric pressure sensor 105 as the upstream pressure Pa. Further, for example, when the internal combustion engine 10 is an internal combustion engine including a forced-induction device, the sum of the atmospheric pressure PA and the boost pressure by the forced-induction device can be assumed to be substantially the same as the upstream pressure Pa. Therefore, the upstream pressure acquisition process 58 acquires the sum of the atmospheric pressure PA and the boost pressure as the upstream pressure Pa. The boost pressure referred to here is a relative pressure with reference to the atmospheric pressure PA, that is, a so-called gauge pressure.

The pressure ratio calculation process 53 calculates a throttle upstream-downstream pressure ratio Rs (Rs=Pm/Pa) that is a ratio of the downstream pressure Pm acquired by the downstream pressure acquisition process 52 to the upstream pressure Pa acquired by the upstream pressure acquisition process 58.

The change characteristics of the intake air amount when the throttle opening degree TA is changed are as follows.

When the throttle opening degree TA is small and the flow velocity of the intake air in the intake passage 17 is high, the change amount of the intake air amount GA when the throttle opening degree TA is changed tends to be large.

When the throttle opening degree TA is large or when the flow velocity of the intake air in the intake passage 17 is low, it is less likely for the change amount of the intake air amount GA when the throttle opening degree TA is changed to become large.

Further, when the change amount of the intake air amount GA when the throttle opening degree TA is changed tends to be large as in a case where the throttle opening degree TA is small and the flow velocity of the intake air in the intake passage 17 is high, the throttle upstream-downstream pressure ratio Rs becomes small. When it is less likely for the change amount of the intake air amount GA when the throttle opening degree TA is changed to become large as in a case where the throttle opening degree TA is large or a case where the flow velocity of the intake air in the intake passage 17 is low, the throttle upstream-downstream pressure ratio Rs tends to be large. That is, the throttle upstream-downstream pressure ratio Rs can be said to be a value correlated with nonlinear characteristics of the change amount of the intake air amount GA with respect to the change amount of the throttle opening degree TA in which the change characteristics of the intake air amount when the throttle opening degree TA is changed is reflected.

The first calculation process 54 calculates the difference between a required value PmR of the downstream pressure Pm and the downstream pressure Pm acquired by the downstream pressure acquisition process 52 as a pressure difference ΔPm. The required value PmR of the downstream pressure Pm is a required value calculated based on the target torque TrqTr. That is, in the engine control, an engine load factor KL is calculated based on the target torque TrqTr. Further, the required value PmR of the downstream pressure Pm is calculated based on the engine load factor KL. For example, the required value PmR of the downstream pressure Pm is calculated so as to become higher as the engine load factor KL becomes higher. The engine load factor KL is a value indicating the rate of the current intake air amount to the maximum value of the intake air amount corresponding to the engine rotation speed NE. Therefore, when the current intake air amount is equal to the maximum value of the intake air amount corresponding to the engine rotation speed NE, the engine load factor KL becomes 100%.

The target value correction process 55 includes a first correction coefficient calculation process 551, a second correction coefficient calculation process 552, a second calculation process 553, a third calculation process 554, and a fourth calculation process 555.

The first correction coefficient calculation process 551 performs a process of calculating a first correction coefficient Gainb so that the first correction coefficient Gainb becomes higher as the pressure difference ΔPm calculated by the first calculation process 54 becomes larger. That is, the first correction coefficient calculation process 551 causes the first correction coefficient Gainb to be equal to 0 when the pressure difference ΔPm is equal to 0. Further, the first correction coefficient calculation process 551 causes the first correction coefficient Gainb to be higher than 0 when the pressure difference ΔPm is a positive value. Further, the first correction coefficient calculation process 551 causes the first correction coefficient Gainb to be lower than 0 when the pressure difference ΔPm is a negative value.

The second correction coefficient calculation process 552 performs process of calculating a second correction coefficient Kb based on the throttle upstream-downstream pressure ratio Rs calculated by the pressure ratio calculation process 53.

The process of calculating the second correction coefficient Kb is specifically described. The second correction coefficient Kb can be calculated with use of a relational expression (Expression 1) shown below.

$$Kb = \Phi(Rs) \quad \text{(Expression 1)}$$

The function $\Phi(Rs)$ in the relational expression (Expression 1) is a function that causes the second correction coefficient Kb to be lower when the throttle upstream-downstream pressure ratio Rs is large than when the throttle upstream-downstream pressure ratio Rs is small. Specifically, when the throttle upstream-downstream pressure ratio Rs is less than a specified pressure ratio RsTh, $\Phi(Rs)$ can be expressed by a relational expression (Expression 2). When the throttle upstream-downstream pressure ratio Rs is equal to or more than the specified pressure ratio RsTh, $\Phi(Rs)$ can be expressed by a relational expression (Expression 3). In the relational expressions (Expression 2) and (Expression 3), κ represents a heat capacity ratio of the air.

$$\Phi(Rs) = \sqrt{\frac{\kappa}{2 \cdot (\kappa + 1)}} \quad \text{(Expression 2)}$$

$$\Phi(Rs) = \sqrt{\left\{\frac{\kappa - 1}{2 \cdot \kappa} \cdot (1 - Rs) + Rs\right\} \cdot (1 - Rs)} \quad \text{(Expression 3)}$$

When the throttle upstream-downstream pressure ratio Rs is relatively small, the intake air amount GA can be significantly changed in accordance with the change of the throttle opening degree TA due to the change characteristics of the intake air amount when the throttle opening degree TA is changed. When the throttle upstream-downstream pressure ratio Rs is relatively large, the intake air amount GA does not change significantly even when the throttle opening degree TA changes due to the change characteristics of the intake air amount when the throttle opening degree TA is changed. Thus, in this embodiment, whether the throttle upstream-downstream pressure ratio Rs is large, that is, whether the throttle upstream-downstream pressure ratio Rs is close to 1 is determined in accordance with whether the throttle upstream-downstream pressure ratio Rs is equal to or more than the specified pressure ratio RsTh.

Figure 3:
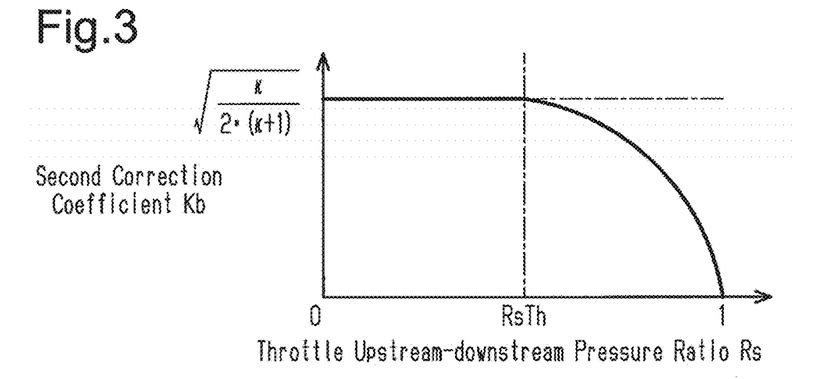
FIG. 3 is a graph showing the relationship between a second correction coefficient and a throttle upstream-downstream pressure ratio in the controller in FIG. 2.

Therefore, as illustrated in FIG. 3, the second correction coefficient Kb is maintained at a specified value when the throttle upstream-downstream pressure ratio Rs is less than the specified pressure ratio RsTh, and becomes less than the specified value when the throttle upstream-downstream pressure ratio Rs is equal to or more than the specified pressure ratio RsTh. Specifically, when the throttle upstream-downstream pressure ratio Rs is equal to or more than the specified pressure ratio RsTh, the second correction coefficient Kb gradually decreases as the throttle upstream-downstream pressure ratio Rs approaches 1. The specified value herein is $\Phi(Rs)$ expressed by the above-mentioned relational expression (Expression 2), and is $\sqrt{\{\kappa/(2 \cdot (\kappa+1))\}}$ in this embodiment. Further, the specified pressure ratio RsTh is the throttle upstream-downstream pressure ratio Rs when the right side of the relational expression (Expression 3) becomes equal to the right side of the relational expression (Expression 2).

Returning to FIG. 2, the second calculation process 553 calculates the product of the first correction coefficient Gainb calculated by the first correction coefficient calculation process 551 and the second correction coefficient Kb calculated by the second correction coefficient calculation process 552 as a total correction coefficient Gaint.

The third calculation process 554 calculates the product of the throttle opening degree target value TATr derived by the target value derivation process 51 and the total correction coefficient Gaint calculated by the second calculation process 553.

The fourth calculation process 555 calculates the sum of the throttle opening degree target value TATr calculated by the target value derivation process 51 and the calculation result (TATr×Gaint) of the third calculation process 554 as the throttle opening degree target value TATr after correction. That is, in this embodiment, the absolute value (|TATr× Gaint|) of the calculation result of the third calculation process 554 corresponds to the correction amount of the throttle opening degree target value TATr. Further, process of calculating the throttle opening degree target value TATr after correction is performed by the third calculation process 554 and the fourth calculation process 555 so that the correction amount of the throttle opening degree target value TATr becomes equal to the absolute value of the product of the throttle opening degree target value TATr before correction, the first correction coefficient Gainb, and the second correction coefficient Kb.

The operation amount calculation process 56 calculates an opening degree difference ΔTA that is a difference between the throttle opening degree target value TATr after correction calculated by the fourth calculation process 555 and the throttle opening degree TA. Further, the operation amount calculation process 56 calculates an operation instruction value IVs for the actuator 23 as the operation amount of the throttle valve 22 by performing known feedback control based on the calculated opening degree difference ΔTA.

The throttle operation process 57 controls the actuator 23 to be driven based on the operation instruction value IVs calculated by the operation amount calculation process 56. That is, the throttle operation process 57 controls the operation of the throttle valve 22.

Figure 4:
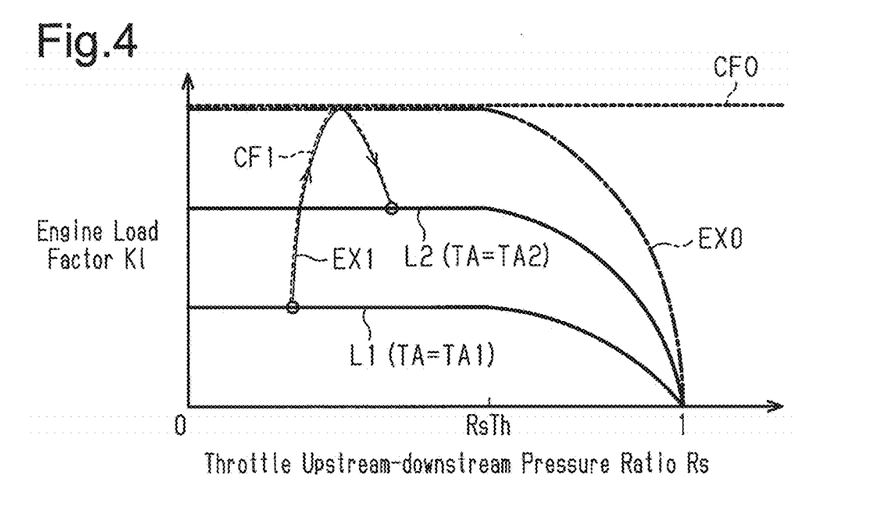
FIG. 4 is a graph showing changes in a throttle opening degree when a throttle opening degree target value is changed in a situation in which the throttle upstream-downstream pressure ratio is relatively small in the controller in FIG. 2.
Figure 5:
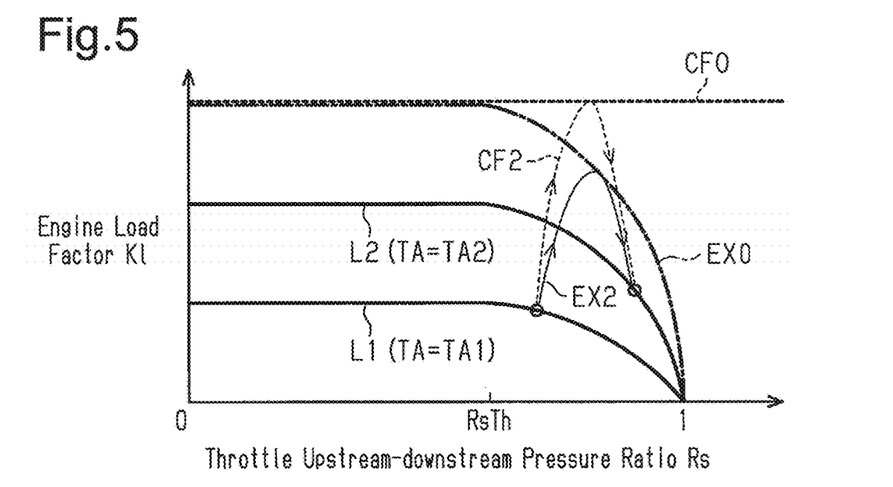
FIG. 5 is a graph showing changes in the throttle opening degree when the throttle opening degree target value is changed in a situation in which the throttle upstream-downstream pressure ratio is relatively large in the controller in FIG. 2.

Next, with reference to FIGS. 4 and 5, the operation and advantages of this embodiment are described. FIGS. 4 and 5 are graphs in which the horizontal axis is the throttle upstream-downstream pressure ratio Rs and the vertical axis is the engine load factor KL. In each of the graphs of FIGS. 4 and 5, the characteristic line L1 is a line indicating the relationship between the throttle upstream-downstream pressure ratio Rs and the engine load factor KL when the throttle opening degree TA is a first opening degree TA1, and the characteristic line L2 is a line indicating the relationship between the throttle upstream-downstream pressure ratio Rs and the engine load factor KL when the throttle opening degree TA is a second opening degree TA2.

FIG. 4 shows an example in which the throttle opening degree TA is changed from the first opening degree TA1 to the second opening degree TA2 in a situation in which the throttle upstream-downstream pressure ratio Rs is less than the specified pressure ratio RsTh. The second opening degree TA2 is larger than the first opening degree TA1 (TA1<TA2).

The throttle upstream-downstream pressure ratio Rs used in the calculation of the second correction coefficient Kb is a value correlated with the nonlinear characteristics of the change amount of the intake air amount GA with respect to the change amount of the throttle opening degree TA in which the change characteristics of the intake air amount when the throttle opening degree TA is changed is reflected. Therefore, when the throttle upstream-downstream pressure ratio Rs is small, it can be estimated that the throttle opening degree TA is relatively small and the flow velocity of the intake air in the intake passage 17 is relatively high. When the throttle opening degree TA is increased in the case as above, the increase amount of the intake air amount GA tends to be large.

In this embodiment, when the throttle upstream-downstream pressure ratio Rs is less than the specified pressure ratio RsTh, the second correction coefficient Kb is calculated with use of the above-mentioned relational expression (Expression 2). That is, when the throttle opening degree TA is relatively small and the flow velocity of the intake air in the intake passage 17 relatively high, the second correction coefficient Kb is calculated with use of the above-mentioned relational expression (Expression 2). Therefore, the correction amount of the throttle opening degree target value TATr tends to be large due to the correction of the throttle opening degree target value TATr by the target value correction process 55. As a result, when the difference between the second opening degree TA2 that is the opening degree to which the throttle opening degree TA converges and the first opening degree TA1 is large, the throttle opening degree target value TATr is corrected so as to significantly increase by the target value correction process 55. In FIG. 4, the throttle opening degree target value TATr after correction that is calculated when the throttle opening degree target value TATr is changed is indicated by the bold dashed-dotted line EX0.

Further, the operation of the throttle valve 22 is controlled by the operation instruction value IVs calculated by the feedback control using the throttle opening degree target value TATr corrected as above. Therefore, the throttle opening degree TA changes as indicated by the solid line EX1 in FIG. 4. That is, the throttle opening degree TA starts from the first opening degree TA1, significantly overshoots the second opening degree TA2 that is the target value of the final throttle opening degree, and then converges to the second opening degree TA2. By operating the throttle valve 22 as above, the intake air amount GA can be speedily increased. That is, the delay in the change of the intake air amount GA with respect to the change of the throttle opening degree target value TATr can be suppressed.

In FIG. 4, as an comparative example, a case where the throttle opening degree target value TATr is corrected without using the throttle upstream-downstream pressure ratio Rs, that is, without considering the change characteristics of the intake air amount when the throttle opening degree TA is changed is indicated by the broken line CF1. In the comparative example, the throttle opening degree target value TATr is corrected with use of the second correction coefficient Kb that is always equal to $\Phi(Rs)$ expressed by the above-mentioned relational expression (Expression 2) regardless of the size of the throttle upstream-downstream pressure ratio Rs. In FIG. 4, the throttle opening degree target value TATr after correction calculated when the throttle opening degree target value TATr is changed in the comparative example is indicated by the bold broken line CF0. In the comparative example, the operation of the throttle valve 22 is controlled in accordance with the operation instruction value IVs calculated by the feedback control using the throttle opening degree target value corrected based on the above-mentioned pressure difference $\Delta Pm$. Therefore, as indicated by the broken line CF1 in FIG. 4, the throttle opening degree TA starts from the first opening degree TA1, significantly overshoots the second opening degree TA2, and then converges to the second opening degree TA2.

That is, in this embodiment (EX1), when the throttle opening degree TA is small and the flow velocity of the intake air in the intake passage 17 is low, a response delay of the intake air amount GA can be suppressed as with the case for the comparative example (CF1) as shown in FIG. 4. That is, the output torque of the internal combustion engine 10 can be increased toward the target torque at an early stage.

In FIG. 5, an example in which the throttle opening degree TA is increased from the first opening degree TA1 to the second opening degree TA2 in a situation in which the throttle upstream-downstream pressure ratio Rs is equal to or more than the specified pressure ratio RsTh is shown. When the throttle upstream-downstream pressure ratio Rs is close to 1 as above, the throttle opening degree TA is relatively large and the flow velocity of the intake air in the intake passage 17 relatively low. In the case as above, it is less likely for the increase amount of the intake air amount GA to become large even when the throttle opening degree TA is increased.

In this embodiment, when the throttle upstream-downstream pressure ratio Rs is equal to or more than the specified pressure ratio RsTh, the second correction coefficient Kb is calculated with use of the above-mentioned relational expression (Expression 3). That is, when the throttle opening degree TA is relatively small or when the flow velocity of the intake air in the intake passage 17 is relatively low, the second correction coefficient Kb is calculated with use of the above-mentioned relational expression (Expression 3). Therefore, in this embodiment, in a situation as above, the second correction coefficient Kb decreases as the throttle upstream-downstream pressure ratio Rs approaches 1. Therefore, even when the target value correction process 55 corrects the throttle opening degree target value TATr, it is less likely for the correction amount of the throttle opening degree target value TATr to become large. As a result, even when the difference between the second opening degree TA2 that is the opening degree to which the throttle opening degree TA converges and the first opening degree TA1 is large, the increase in the increase correction amount of the throttle opening degree target value TATr by the target value correction process 55 can be suppressed.

Further, the operation of the throttle valve 22 is controlled by the operation instruction value IVs calculated by the feedback control using the throttle opening degree target value TATr corrected as above. Therefore, the throttle opening degree TA changes as indicated by the solid line EX2 in FIG. 5. That is, the throttle opening degree TA starts from the first opening degree TA1 and converges to the second opening degree TA2 after exceeding the second opening degree TA2, but the overshoot amount with respect to the second opening degree TA2 does not increase significantly.

In FIG. 5, changes in the throttle opening degree TA in the above-mentioned comparative example are shown by the broken line CF2. In the comparative example, the throttle opening degree target value TATr is corrected without considering the change characteristics of the intake air amount when the throttle opening degree TA is changed. Therefore, although the intake air amount GA does not change significantly even when the throttle opening degree TA is increased, the throttle opening degree TA starts from the first opening degree TA1, significantly exceeds the second opening degree TA2, and then converges to the second opening degree TA2. That is, in the comparative example, it can be said that the throttle valve 22 is excessively operated although the response speed of the intake air amount GA hardly changes even when the operation amount of the throttle valve 22 is increased.

In contrast, in this embodiment (EX2), the throttle opening degree target value TATr is corrected in consideration of the change characteristics of the intake air amount when the throttle opening degree TA is changed unlike the comparative example (CF2). Therefore, when the intake air amount GA does not increase significantly even when the throttle opening degree TA is increased, excessive operation of the throttle valve 22 can be suppressed.

Therefore, in this embodiment, the throttle opening degree target value TATr is corrected in consideration of the change characteristics of the intake air amount when the throttle opening degree TA is changed. Thus, the delay in the change of the intake air amount GA with respect to the increase of the throttle opening degree target value TATr can be suppressed while suppressing excessive operation of the throttle valve 22.

Next, the operation and advantages when the throttle opening degree TA is reduced, that is, when the throttle opening degree TA is changed from the second opening degree TA2 to the first opening degree TA1 are described.

Even when the throttle opening degree TA is reduced as above, the throttle opening degree target value TATr based on the target torque TrqTr is corrected with use of the first correction coefficient Gainb and the second correction coefficient Kb. That is, when the throttle opening degree TA is reduced, the required value PmR of the downstream pressure becomes lower than the downstream pressure Pm, and hence the first correction coefficient Gainb calculated based on the pressure difference ΔPm (ΔPm=PmR−Pm) becomes a negative value. Therefore, the throttle opening degree target value TATr is corrected to decrease by the correction of the throttle opening degree target value TATr using the first correction coefficient Gainb and the second correction coefficient Kb.

At this time, when the throttle upstream-downstream pressure ratio Rs is less than the specified pressure ratio RsTh, the second correction coefficient Kb is calculated with use of the above-mentioned relational expression (Expression 2). That is, when the throttle opening degree TA is relatively small and the flow velocity of the intake air in the intake passage 17 is relatively high, the second correction coefficient Kb is calculated with use of the above-mentioned relational expression (Expression 2). Therefore, the correction amount of the throttle opening degree target value TATr tends to be large by the correction of the throttle opening degree target value TATr by the target value correction process 55. As a result, when the difference between the first opening degree TA1 that is the opening degree to which the throttle opening degree TA converges and the second opening degree TA2 is large, the throttle opening degree target value TATr is corrected to significantly decrease by the target value correction process 55.

Further, the operation of the throttle valve 22 is controlled by the operation instruction value IVs calculated by the feedback control using the throttle opening degree target value TATr corrected as above. Therefore, the throttle opening degree TA starts from the second opening degree TA2, significantly undershoots the first opening degree TA1, and then converges to the first opening degree TA1. By operating the throttle valve 22 as above, the intake air amount GA can be speedily reduced. That is, the delay in the change of the intake air amount GA with respect to the change of the throttle opening degree target value TATr can be suppressed.

When the throttle upstream-downstream pressure ratio Rs is equal to or more than the specified pressure ratio RsTh, the second correction coefficient Kb is calculated with use of the above-mentioned relational expression (Expression 3). That is, when the throttle opening degree TA is relatively large or when the flow velocity of the intake air in the intake passage 17 is relatively low, the second correction coefficient Kb is calculated with use of the above-mentioned relational expression (Expression 3). Therefore, even when the target value correction process 55 corrects the throttle opening degree target value TATr, it is less likely for the correction amount of the throttle opening degree target value TATr to become large. As a result, even when the difference between the first opening degree TA1 and the second opening degree TA2 is large, the increase in the decrease correction amount of the throttle opening degree target value TATr by the target value correction process 55 can be suppressed.

Further, the operation of the throttle valve 22 is controlled based on the operation instruction value IVs calculated by the feedback control using the throttle opening degree target value TATr corrected as above. Therefore, the throttle opening degree TA starts from the second opening degree TA2, undershoots the first opening degree TA1, and then converges to the first opening degree TA1, but the undershoot amount with respect to the first opening degree TA1 does not increase significantly. As a result, when the intake air amount GA does not decrease significantly even when the throttle opening degree TA is reduced, excessive operation of the throttle valve 22 can be suppressed.

The advantages described below can be further obtained in this embodiment.

When the second correction coefficient Kb is calculated, a calculation method using the throttle opening degree TA and the flow velocity of the intake air in the intake passage 17 instead of the throttle upstream-downstream pressure ratio Rs can be conceived. Under the condition in which the flow velocity of the intake air is constant, it is likely for the change amount of the intake air amount GA with respect to the change of the throttle opening degree target value TATr to become large as the throttle opening degree TA decreases. However, even when the throttle opening degree TA is changed from the first opening degree TA1 to the second opening degree TA2, the change amount of the intake air amount GA changes in accordance with the flow velocity of the intake air. That is, the change amount of the above-mentioned intake air amount GA when the flow velocity of the intake air is low is less than the change amount of the above-mentioned intake air amount GA when the flow velocity of the intake air is high. Therefore, a map or a relational expression indicating the relationship between the throttle opening degree TA and the second correction coefficient Kb needs to be prepared for each flow velocity of the intake air.

With regards to the point, in this embodiment, the second correction coefficient Kb is calculated with use of the throttle upstream-downstream pressure ratio Rs. In that case, the second correction coefficient Kb can be set to a value in accordance with the throttle opening degree TA at that time and the flow velocity of the intake air in the intake passage 17 by only preparing the above-mentioned relational expressions (Expression 2) and (Expression 3). That is, the second correction coefficient Kb can be easily calculated in this embodiment as compared to a case where the second correction coefficient Kb is calculated with use of the throttle opening degree TA and the flow velocity of the intake air in the intake passage 17 instead of the throttle upstream-downstream pressure ratio Rs, for example.

The present embodiment may be modified as follows. The present embodiment and the following modifications can be combined as long as the combined modifications remain technically consistent with each other.

In the above-mentioned embodiment, the throttle opening degree target value TATr is corrected with use of the second correction coefficient Kb not only when the throttle opening degree TA is increased but also even when the throttle opening degree TA is reduced. However, if the throttle opening degree target value TATr is corrected with use of the second correction coefficient Kb when the throttle opening degree TA is increased, the throttle opening degree target value TATr does not necessarily need to be corrected with use of the second correction coefficient Kb when the throttle opening degree TA is reduced.

Further, if the throttle opening degree target value TATr is corrected with use of the second correction coefficient Kb when the throttle opening degree TA is reduced, the throttle opening degree target value TATr does not necessarily need to be corrected with use of the second correction coefficient Kb when the throttle opening degree TA is increased.

When the throttle upstream-downstream pressure ratio Rs is equal to or more than the specified pressure ratio RsTh, the second correction coefficient Kb may be calculated by a different calculate method that does not use the above-mentioned relational expression (Expression 3) if the second correction coefficient Kb can be reduced as the throttle upstream-downstream pressure ratio Rs approaches 1.

When the throttle upstream-downstream pressure ratio Rs is equal to or more than the specified pressure ratio RsTh, the second correction coefficient Kb may be gradually reduced as the throttle upstream-downstream pressure ratio Rs approaches 1 if the second correction coefficient Kb can be reduced as the throttle upstream-downstream pressure ratio Rs approaches 1.

When the throttle upstream-downstream pressure ratio Rs is equal to or more than the specified pressure ratio RsTh, the second correction coefficient Kb does not necessarily need to be variable in accordance with the throttle upstream-downstream pressure ratio Rs if the second correction coefficient Kb can set to be less than the specified value. For example, when the throttle upstream-downstream pressure ratio Rs is equal to or more than the specified pressure ratio RsTh, the second correction coefficient Kb may be maintained at a predetermined value that is less than the specified value.

When the throttle upstream-downstream pressure ratio Rs is less than the specified pressure ratio RsTh, the second correction coefficient Kb does not necessarily need to be maintained at the specified value. That is, even when the throttle upstream-downstream pressure ratio Rs is less than the specified pressure ratio RsTh, the second correction coefficient Kb may be calculated so that the second correction coefficient Kb increases as the throttle upstream-downstream pressure ratio Rs decreases.

After performing the first correction process for calculating the product of the throttle opening degree target value TATr derived by the target value derivation process 51 and the first correction coefficient Gainb, the second correction process for calculating the product of the value (TATr× Gainb) calculated by the first correction process and the second correction coefficient Kb may be performed, and then process of calculating the sum of the throttle opening degree target value TATr derived by the target value derivation process 51 and the calculation result of the second correction process as the throttle opening degree target value TATr after correction may be performed. Also in that case, the throttle opening degree target value TATr can be corrected by taking the change characteristics of the intake air amount when the throttle opening degree TA is changed into account.

When the second correction coefficient Kb is calculated, the throttle opening degree TA and the flow velocity of the intake air in the intake passage 17 may be used instead of the throttle upstream-downstream pressure ratio Rs.

The controller 50 is not limited to a device that includes an ECU or a CPU and a ROM and executes software process, but is not limited to this configuration. For example, at least part of the processes executed by the software in the above-described embodiments may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software process circuits each including a processor and a program storage device and a plurality of dedicated hardware circuits may be provided. That is, the above processes may be executed in any manner as long as the processes are executed by process circuitry that includes at least one of a set of one or more software process circuits and a set of one or more dedicated hardware circuits.

The invention claimed is:

1. A controller for an internal combustion engine, the internal combustion engine including a throttle valve provided in an intake passage, the controller being configured to perform:
   a target value derivation process for deriving a throttle opening degree target value based on a target torque of the internal combustion engine, the throttle opening degree target value being a target value of an opening degree of the throttle valve;

a process of calculating an operation amount of the throttle valve by feedback control based on a difference between the throttle opening degree target value and a throttle opening degree that is an opening degree of the throttle valve;

a process of operating the throttle valve based on the operation amount;

a target value correction process of correcting the throttle opening degree target value derived by the target value derivation process so that the operation amount calculated by the feedback control increases; and a downstream pressure acquisition process of acquiring a downstream pressure that is a pressure downstream of the throttle valve in the intake passage, wherein a difference between the throttle opening degree target value before correction and the throttle opening degree target value after correction is defined as a correction amount, a difference between a required value of the downstream pressure and the downstream pressure is defined as a pressure difference, the target value correction process is configured correct the throttle opening degree target value derived by the target value derivation process such that the correction amount increases as an absolute value of the pressure difference increases, the correction amount is smaller when the throttle opening degree is large than when the throttle opening degree is small, and the correction amount is smaller when a flow velocity of intake air in the intake passage is low than when the flow velocity of the intake air is high.

2. The controller for an internal combustion engine according to claim 1, wherein the controller is further configured to perform an upstream pressure acquisition process of acquiring an upstream pressure that is a pressure upstream of the throttle valve in the intake passage, and a ratio of the downstream pressure to the upstream pressure is defined as a throttle upstream-downstream pressure ratio, the target value correction process is configured to perform a process of calculating a first correction coefficient so that the first correction coefficient increases as the pressure difference increases, a process of calculating a second correction coefficient so that the second correction coefficient decreases as the throttle upstream-downstream pressure ratio approaches 1, and a process of calculating a throttle opening degree target value after correction so that an absolute value of a product of the throttle opening degree target value derived by the target value derivation process, the first correction coefficient, and the second correction coefficient is equal to the correction amount.

3. The controller for an internal combustion engine according to claim 2, wherein the target value correction process is configured to maintain the second correction coefficient at a specified value when the throttle upstream-downstream pressure ratio is less than a specified pressure ratio, and cause the second correction coefficient to be less than the specified value when the throttle upstream-downstream pressure ratio is equal to or more than the specified pressure ratio.

4. The controller for an internal combustion engine according to claim 3, wherein the target value correction process is configured to calculate the second correction coefficient so that the second correction coefficient gradually decreases as the throttle upstream-downstream pressure ratio approaches 1 when the throttle upstream-downstream pressure ratio is equal to or more than the specified pressure ratio.

5. The controller for an internal combustion engine according to claim 1, wherein the target value correction process is configured to correct and increase the throttle opening degree target value derived by the target value derivation process when the throttle opening degree target value increases.

6. A control method for an internal combustion engine, the internal combustion engine including a throttle valve provided in an intake passage, the method comprising processes executed by a controller, the processes including:

a target value derivation process for deriving a throttle opening degree target value based on a target torque of the internal combustion engine, the throttle opening degree target value being a target value of an opening degree of the throttle valve;

a process of calculating an operation amount of the throttle valve by feedback control based on a difference between the throttle opening degree target value and a throttle opening degree that is an opening degree of the throttle valve;

a process of operating the throttle valve based on the operation amount;

a target value correction process of correcting the throttle opening degree target value derived by the target value derivation process so that the operation amount calculated by the feedback control increases; and a downstream pressure acquisition process of acquiring a downstream pressure that is a pressure downstream of the throttle valve in the intake passage, wherein a difference between the throttle opening degree target value before correction and the throttle opening degree target value after correction is defined as a correction amount, a difference between a required value of the downstream pressure and the downstream pressure is defined as a pressure difference, the target value correction process is configured correct the throttle opening degree target value derived by the target value derivation process such that the correction amount increases as an absolute value of the pressure difference increases, the correction amount is smaller when the throttle opening degree is large than when the throttle opening degree is small, and the correction amount is smaller when a flow velocity of intake air in the intake passage is low than when the flow velocity of the intake air is high.

7. A non-transitory computer readable memory medium that stores a program that causes a processor to execute a control process of an internal combustion engine, the internal combustion engine including a throttle valve provided in an intake passage, the control process including:

a target value derivation process for deriving a throttle opening degree target value based on a target torque of the internal combustion engine, the throttle opening degree target value being a target value of an opening degree of the throttle valve;
a process of calculating an operation amount of the throttle valve by feedback control based on a difference between the throttle opening degree target value and a throttle opening degree that is an opening degree of the throttle valve;
a process of operating the throttle valve based on the operation amount;
a target value correction process of correcting the throttle opening degree target value derived by the target value derivation process so that the operation amount calculated by the feedback control increases; and
a downstream pressure acquisition process of acquiring a downstream pressure that is a pressure downstream of the throttle valve in the intake passage, wherein
a difference between the throttle opening degree target value before correction and the throttle opening degree target value after correction is defined as a correction amount,
a difference between a required value of the downstream pressure and the downstream pressure is defined as a pressure difference,
the target value correction process is configured correct the throttle opening degree target value derived by the target value derivation process such that
the correction amount increases as an absolute value of the pressure difference increases,
the correction amount is smaller when the throttle opening degree is large than when the throttle opening degree is small, and
the correction amount is smaller when a flow velocity of intake air in the intake passage is low than when the flow velocity of the intake air is high.

* * * * *